March 6, 1951  O. R. WINKLER  2,544,578
SELF-FEEDING DEVICE FOR LIVESTOCK
Filed March 31, 1947  3 Sheets-Sheet 1
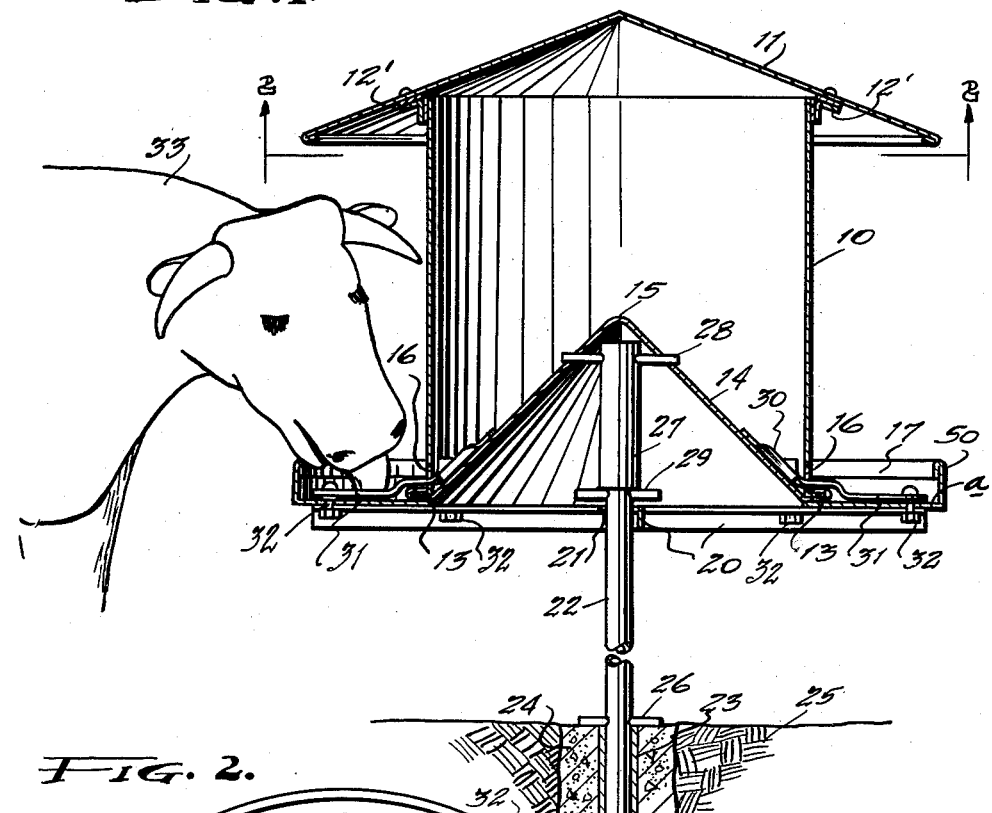
ORVILLE R. WINKLER
INVENTOR.
BY Cecil L. Wood
ATTORNEY March 6, 1951     O. R. WINKLER     2,544,578
SELF-FEEDING DEVICE FOR LIVESTOCK Filed March 31, 1947     3 Sheets-Sheet 2

ORVILLE R. WINKLER
INVENTOR.

BY Cecil L. Prod

ATTORNEY

March 6, 1951 O. R. WINKLER 2,544,578
SELF-FEEDING DEVICE FOR LIVESTOCK
Filed March 31, 1947 3 Sheets-Sheet 3
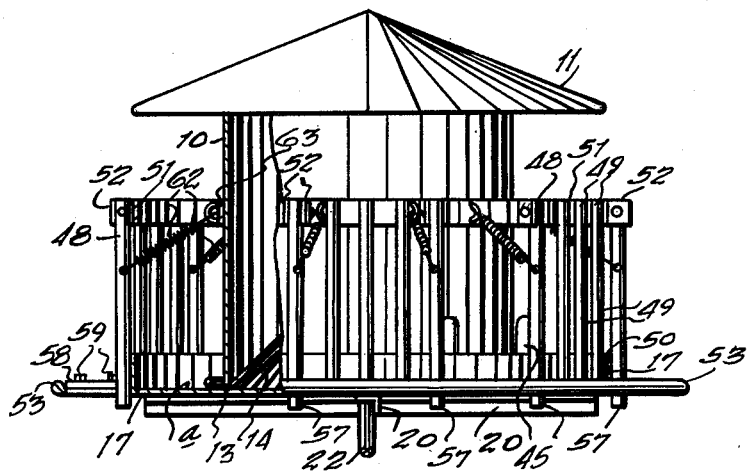
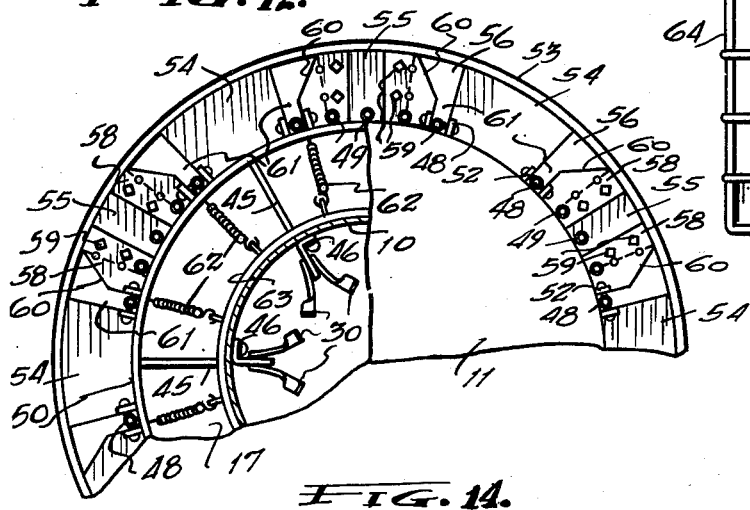
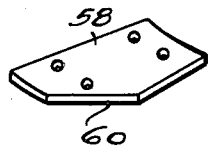
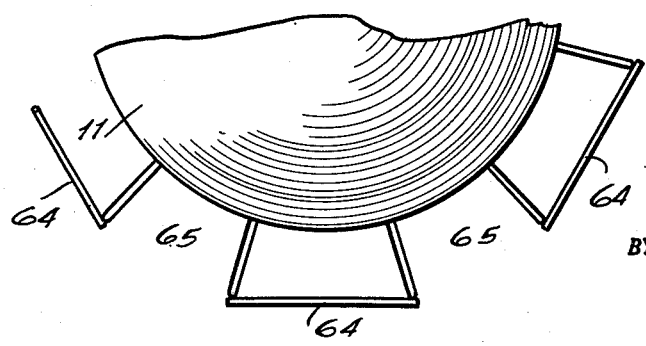
ORVILLE R. WINKLER
INVENTOR.
BY
ATTORNEY Patented Mar. 6, 1951

2,544,578

UNITED STATES PATENT OFFICE 2,544,578

SELF-FEEDING DEVICE FOR LIVESTOCK

Orville R. Winkler, Fort Worth, Tex.

Application March 31, 1947, Serial No. 738,297

2 Claims. (Cl. 119—54)

This invention relates to feeding devices for livestock, or the like, and it has particular reference to self-feeders for dispensing foods, minerals, and similar commodities, and its principal object resides in the provision of a simple and economical structure capable of being installed in feeding pens, pastures, and other livestock concentration points, and affords means whereby the contents of the apparatus can be automatically dispensed by the stock feeding therefrom.

Another object of the invention resides in the provision of a feeder device which is light in structure yet sturdy, and capable of being easily ported about the feeding area and readily installed at any desired location accessible to livestock, affording means for constantly maintaining a proper mineral diet before livestock, including various types of feeds, while preventing waste and damage from wet weather.

A further object of the invention is that of providing a self-feeding device in which the feeding trough thereof is removable and capable of being changed from time to time as rust or corrosion occurs from such products as salt, or other corrosive minerals.

Broadly, the invention contemplates the provision of a self-dispensing apparatus for feeds and minerals for all types of livestock, including cattle, horses, sheep, hogs, and the like, whereby greater efficiency in feeding programs can be practiced with economy and consistency and with a minimum of effort.

While the foregoing objects are paramount, other and lesser objects will become manifest as the description proceeds, taken in connection with the appended drawings wherein:

Figure 1 is a vertical cross-sectional view of one form of the invention, taken on lines 1—1 of Figure 2, showing the conical bottom of the hopper, the pivotal support, and agitator devices.

Figure 2 is a lateral sectional view of the invention, taken on lines 2—2 of Figure 1, illustrating the radial arrangement of tensioned agitators.

Figure 3 is a perspective view of one of the agitator members.

Figure 4 is a fragmentary transverse sectional view of a modified form of one of the agitator members.

Figure 9:
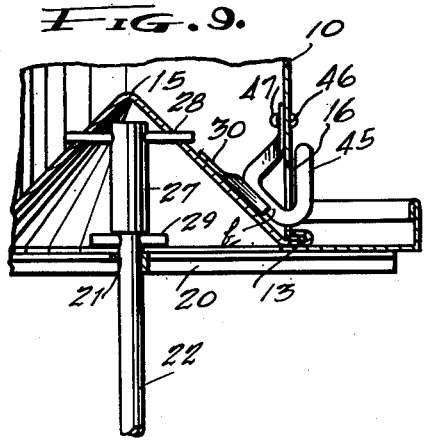
Figure 9 is a fragmentary cross-sectional illustration of the invention showing modified agitating members.
Figure 10:
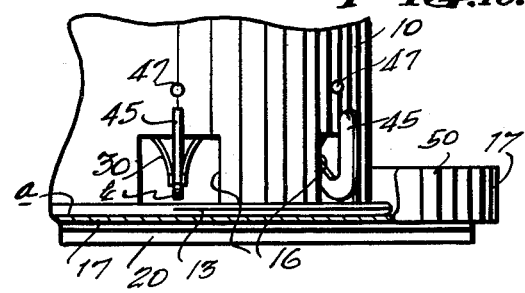

Figure 10 fragmentarily shows, in partial section, the arrangement of agitator members shown in Figure 9.

Figure 11 illustrates, in elevation another modification of the invention, a portion being shown broken away, illustrating a feeding device for small animals.

Figure 12 is a fragmentary plan view of the form of the invention shown in Figure 12 illustrating the expansible stanchions.

Figure 13 is a fragmentary elevational view of the invention having spaced stanchions.

Figure 14 is a fragmentary plan view of the form of the invention shown in Figure 13, and Figure 15 is a perspective illustration of one of the adjustable stanchion plates.

Figure 7:
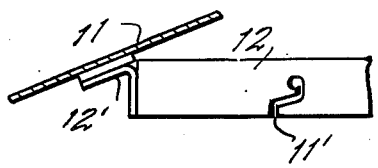
Figure 7 is a fragmentary detail illustration, shown partially in section, of the securing means for the top of the invention.

The invention, in its preferred form, comprises a cylindrical hopper 10 having a substantially conical or convex cover 11 secured thereto by a locking band 12 rigidly secured to the cover 11 by brackets 12', as shown in Figures 1 and 7. Slots 11' in the band 12 are engageable with pins (not shown) spaced about the upper end of the hopper 10. The lower rim 13 is rigidly secured by crimping, or other means, to the periphery of a conical bottom 14 whose apex 15 rises concentrically in the hopper 10. A plurality of openings 16 are spaced about the lower rim 13 of the hopper 10 through which the contents of the latter are dispensed by gravity into a circular trough 17 arranged about the hopper 10 and secured to its lower rim 13 by bolts 18, or the like, as depicted in Figure 2.

The trough 17 is secured by the bolts 18 to horizontally arranged angle members 20 which are radially positioned and have a central bore 21 which embraces a tubular standard 22 by which the entire assembly is pivotally or rotatably supported, as in Figure 1. The standard 22 is adapted to be inserted in a socket 23 preferably set in concrete 24 in the ground 25. A pin 26 is arranged transversely through the standard 22 providing a stop which bears against the top of the socket 23 to support the assembly therein.

The conical bottom 14 is secured to the upper end of a sleeve 27 by a pin 28 arranged transversely therethrough and having its ends extending through the inclined surfaces of the bottom 14. The lower end of the sleeve 27, which latter rotatably embraces the upper end of the standard 22, bears against a pin 29 arranged transversely through the standard 22 just above the radial arrangement of angle members 20 whereby the assembly is locked upon the standard 22.

Figure 8:
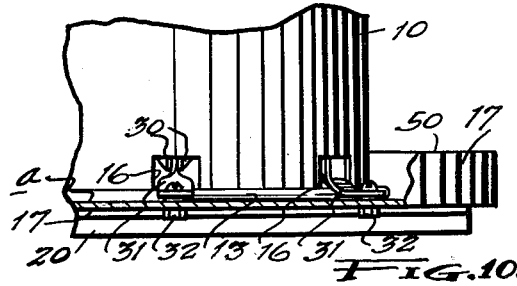
Figure 8 illustrates fragmentarily, and in partial section, the arrangement of openings in the base of the hopper and agitating members.

Spaced about the base of the conical bottom 14 are paired sets of springs 30, opposingly arranged as in Figure 2, at each opening 16. These members engage the inner vertically arranged ends of agitator levers 31 which project through the openings 16 and whose opposite ends are pivotally secured by bolts 32 to the bottom $a$ of the trough 17 so that the levers 31 can be oscillated against the tension of the springs 30 to agitate the contents of the hopper 10 and dislodge them into the trough 17. This can be accomplished by the tongues of animals feeding from the trough 17, as illustrated in Figures 1 and 8.

Obviously, as cattle, or other animals, as the cow 33 in Figure 1, feed from the trough 17 and apply their tongues thereto, the assembly may rotate but the contents of the hopper 10 are evenly distributed around the trough 17 so that several animals can have access thereto at one time. A modified form of the levers 31 is illustrated in transverse section in Figure 4 and comprises a lever 34 having an upturned flange 35 which will expedite its movement by providing greater leverage. The levers 34 are spaced above the floor surface $a$ of the trough 17 on their pivots 32 by spacers 36.

Figure 5:
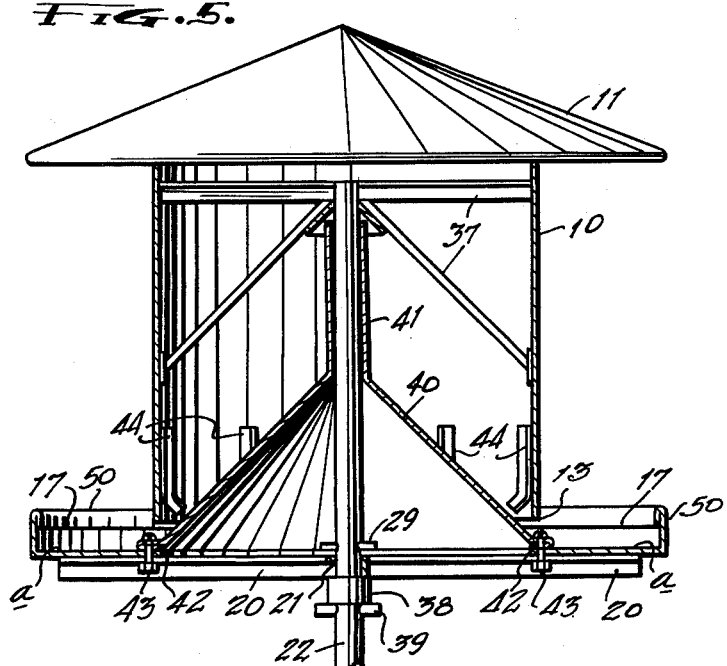
Figure 5 illustrates a modified form of the invention, in vertical section, in which the hopper is stationary while the bottom and trough members rotate.

It is apparent in Figure 5 that the assembly can be constructed so that the hopper 10 is supported rigidly upon the upper end of the standard 22 which, in this form of the invention, extends upwardly through the hopper 10. An arrangement of angle members 37, providing a frame rigidly secured to the inner wall surfaces of the hopper 10, affords a rigid support for the latter. The standard 22 is inserted into a socket 23, as in the case of the structure shown in Figure 1, and the trough 17, not being connected to the lower rim 13 of the hopper 10, is rotatably supported on the standard 22 by a collar 38 retained by a pin 39 arranged transversely of the standard 22.

Figure 6:
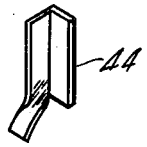
Figure 6 is a perspective illustration of the stationary agitator members employed in the structure shown in Figure 5.

In the structure shown in Figure 5 the conically formed bottom 40 has an upwardly extending integral tube 41 which surrounds the upper end of the standard 22 and serves to prevent the contents of the hopper 10 from dropping through the bottom 40 around the standard 22. The lower rim 42 of the bottom 40 is secured by bolts 43 to the trough 17 rendering the bottom 40 and trough 17 a rigid assembly capable of rotating as a unit. The lower rim 13 of the hopper 10 being spaced above the surface $a$ of the trough 17, the contents of the hopper 10 can flow out into the trough 17 around its entire circumference. The rigidly mounted agitator members 44, attached to the inner wall surfaces of the hopper 10 near its lower rim 13, aid in dislodging the contents as the trough 17 is rotated with the bottom 40. One of the members 44 is shown in detail in Figure 6.

A different type of agitator levers 45 is shown in Figures 9 and 10 although the structure is otherwise identical with that shown in Figures 1, 2 and 8. In this arrangement the members 45 are angularly formed to depend in each opening 16 from their relatively loose pivots 46 within the hopper 10 on rivets or bolts 47, as in Figure 9, and upwardly on the outside so that these members can be actuated by animals sidewise, or inwardly and outwardly to move the contents of the hopper 10. A portion $b$ of the members 45 are arranged between the paired sets of springs 30 to retain these members in proper operative alignment in the openings 16.

Figures 11 and 12 illustrate a form of the invention especially designed for feeding small animals such as calves, sheep and goats. The device is especially useful for the "sneak" feeding of calves to the exclusion of adult cattle by providing stanchions 48 and 49 in vertical spaced arrangement about the hopper 10. The stanchions 48 are flexibly secured and adjustable with respect to each other, as will become apparent, while the members 49 are rigidly secured. The hopper assembly, including the cover and conical bottom, are formed identical with the structure illustrated in Figures 9 and 10.

The stanchions 49 have their lower ends rigidly secured to the vertical rim 50 of the trough 17 while their upper ends are rigidly secured to a supporting ring 51 arranged concentrically about the hopper 10, as shown in Figures 11 and 12. The upper ends of the flexible stanchions 48 are pivotally secured to the ring 51 between radially projecting spaced lugs 52 thereon.

A larger ring 53 is arranged concentrically of the trough 17 and is connected thereto by web plates 54 and 55, at spaced intervals, between which are defined a plurality of open spaces 56 through which the lower ends 57 of the flexible stanchions 48 extend, as apparent in Figure 11.

Adjustable cam plates 58, shown in detail in Figure 15, are attached by bolts 59 to the plates 55, as in Figure 12, and have their angular edges 60 extending into the spaces 56 to define opposing arrangements of slots 61 which flare outwardly on one side so that the stanchions 48, when stress is applied thereagainst in opposite directions and they are moved outwardly toward the ring 53, they will enter the flared portions of the slots 61 and be urged apart at their lower ends. A coil spring 62 is attached to each of the stanchions 48 near their upper ends, as shown in Figures 11 and 12, and at their opposite ends to a ring 63 arranged about the hopper 10, exerting a tension on the members 48 to retain them against the rim 50 of the trough 17.

This arrangement is expedient in the feeding of young calves capable of extending their heads between the stanchions 48 to the trough 17 and providing for their withdrawal by pulling backwardly against the stanchions 48 to expand them into the flared portions of the slots 61 in engagement with the cam plates 58 which latter can be moved apart and reset through the detachable medium of the bolts 59. As the calves grow, therefore, the stanchions 48 can be expanded wider by the adjustment of the cam plates 58.

It is contemplated that a grill arrangement, such as that shown in Figures 13 and 14, may be employed if desired, in which grills 64 are rigidly secured at top and bottom to and spaced outwardly from the rim 50 of the trough 17 and the cover 11. The grills 64 are spaced to provide openings 65 therebetween to admit a small animal's head, particularly that of a calf, to the exclusion of larger or adult cattle, or the like.

Manifestly, the structure herein shown and described is capable of considerable changes and modifications, from time to time by persons skilled in the art, without departing from the spirit and intent of the invention or the scope of the appended claims.

What is claimed is:

1. In a self-feeder for livestock and poultry, having a cylindrical hopper adapted for rotation on a standard and having a conical bottom extending upwardly into said hopper and surrounded by an annular trough integrally secured to said hopper and said bottom and extending laterally therefrom, the combination comprising a plurality of slots formed in the wall of said hopper at the base of said conical bottom, an agitator bar arranged in each of said slots and having its outer end pivoted in the bottom of said trough and its opposite end operatively extending into its respective slot, and a pair of springs in said hopper secured to said conical bottom engaging each of said agitator bars retaining the same in operative position.

2. In a self-feeder for livestock having a cylindrical hopper arranged for rotation on a supporting standard and a conically formed bottom in said hopper having its apex projecting upwardly thereinto, the combination comprising an annular trough formed about said hopper and integral with said bottom providing a receptacle for the contents of said hopper accessible to feeding stock, a plurality of spaced ports about the base of said hopper for dispensing said contents into said trough, an agitator pivotally connected at its outer end in said trough and extending into each port for effecting the discharge of said contents into said trough, and a pair of springs engaging the inner end of each of said agitators yieldably retaining the same in operative position in its respective ports.

ORVILLE R. WINKLER.

REFERENCES CITED

The following references are of record in the file of this patent:

UNITED STATES PATENTS

| Number | Name | Date |
|---|---|---|
| 961,779 | Kellum | June 21, 1910 |
| 1,286,002 | Hoffman | Nov. 26, 1918 |
| 1,311,696 | Hornbeck | July 29, 1919 |
| 1,477,121 | Henderson | Dec. 11, 1923 |
| 1,595,758 | Collins | Aug. 10, 1926 |
| 1,601,030 | Love | Sept. 28, 1926 |
| 1,788,092 | Fink | Jan. 6, 1931 |
| 1,874,137 | Steel | Aug. 30, 1932 |
| 2,226,476 | Maggart | Dec. 24, 1940 |